(12) United States Patent
Sakamoto et al.

(10) Patent No.: US 7,597,507 B2
(45) Date of Patent: Oct. 6, 2009

(54) INSERT TYPE CUTTING INSTRUMENT AND INSERT, METHOD FOR ATTACHING INSERT TO INSERT MAIN BODY

(75) Inventors: Tomoyoshi Sakamoto, Abiko (JP); Touru Narita, Toride (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 11/627,500

(22) Filed: Jan. 26, 2007

(65) Prior Publication Data

US 2007/0177951 A1    Aug. 2, 2007

(30) Foreign Application Priority Data

Jan. 30, 2006  (JP)  ............................. 2006-020949
Oct. 11, 2006  (JP)  ............................. 2006-277479

(51) Int. Cl.
B23C 5/20    (2006.01)

(52) U.S. Cl. ............................ 407/40; 407/53; 407/54; 407/113

(58) Field of Classification Search .................. 407/33, 407/35, 42, 43, 46–48, 53, 54, 113
See application file for complete search history.

(56) References Cited

U.S. PATENT DOCUMENTS

| | | | |
|---|---|---|---|
| 3,629,919 A * | 12/1971 | Trevarrow, Jr. | |
| 4,315,706 A * | 2/1982 | Erkfritz | |
| 4,525,110 A * | 6/1985 | Stojanovski | |
| 4,940,369 A * | 7/1990 | Aebi et al. | |
| 4,946,318 A * | 8/1990 | David et al. | |
| 5,542,795 A * | 8/1996 | Mitchell | |
| 5,893,683 A * | 4/1999 | Johnson | |
| 6,000,449 A * | 12/1999 | De Marco | |
| 6,004,080 A * | 12/1999 | Qvarth et al. | |
| 6,048,140 A * | 4/2000 | Johnson | |
| 6,343,898 B1 * | 2/2002 | Sjoo et al. | |
| 6,413,021 B1 * | 7/2002 | Koch et al. | |
| 6,508,612 B1 * | 1/2003 | Baca | ........................... 407/43 |
| 6,709,205 B2 * | 3/2004 | Morgulis et al. | ............. 407/113 |
| 6,840,716 B2 * | 1/2005 | Morgulis et al. | .............. 407/34 |
| 7,121,769 B2 * | 10/2006 | Satran et al. | ................... 407/40 |

(Continued)

FOREIGN PATENT DOCUMENTS

DE    19846060    6/2000

(Continued)

Primary Examiner—Boyer D Ashley
Assistant Examiner—Sara Addisu
(74) Attorney, Agent, or Firm—Darby & Darby P.C.

(57) ABSTRACT

This insert type cutting instrument includes: an insert formed as a flat polygonal plate, and an instrument main body having a first through-hole and a second through-hole are formed in the insert. The insert is mounted on the seat so that the center of the first screw hole is located closer to the axis than the center of the first through-hole and is located closer to a base end of the body than the center of the first through-hole, and the center of the second screw hole is located closer to the axis than the center of a second through-hole and is located closer to the base end of the body than the center of the second through-hole. Each of the first screw hole and the second screw hole is formed to be orthogonal to an attachment surface of the insert seat.

9 Claims, 8 Drawing Sheets

U.S. PATENT DOCUMENTS

| | | | |
|---|---|---|---|
| 7,300,232 B2 * | 11/2007 | Wiman et al. | 407/101 |
| 7,407,348 B2 * | 8/2008 | Sjogren et al. | 407/119 |
| 2001/0018010 A1 * | 8/2001 | Kichin | 407/24 |
| 2004/0028486 A1 * | 2/2004 | Englund | 407/90 |
| 2005/0158132 A1 * | 7/2005 | Pantzar | |
| 2008/0044239 A1 * | 2/2008 | Sjoo et al. | 407/36 |
| 2009/0035074 A1 * | 2/2009 | Craig et al. | 407/40 |

FOREIGN PATENT DOCUMENTS

| | | |
|---|---|---|
| EP | 0787551 | 8/1997 |
| FR | 2837732 | 10/2003 |
| JP | 58022603 A * | 2/1983 |
| JP | 06008011 A * | 1/1994 |
| JP | 07164213 A * | 6/1995 |
| JP | 09094705 A * | 4/1997 |
| JP | 09300110 A * | 11/1997 |
| JP | 2000-504280 | 4/2000 |
| JP | 2001328011 A * | 11/2001 |
| JP | 2003165004 A * | 6/2003 |
| JP | 2003211306 A * | 7/2003 |
| JP | 2004167635 A * | 6/2004 |
| JP | 2005205527 | 8/2005 |
| WO | 98/48967 | 11/1998 |

* cited by examiner

INSERT TYPE CUTTING INSTRUMENT AND INSERT, METHOD FOR ATTACHING INSERT TO INSERT MAIN BODY

CROSS-REFERENCE TO RELATED APPLICATIONS

Priority is claimed on Japanese Patent Application No. 2006-20949, filed Jan. 30, 2006, and Japanese Patent Application No. 2006-277479, filed Oct. 11, 2006, the content of which is incorporated herein by reference.

BACKGROUND OF THE INVENTION

1. Field of the Invention

The present invention relates to an insert type cutting instrument including an instrument main body in which an insert seat is formed and an insert having a cutting edge detachably attached to the insert seat, the insert, and a method for attaching the insert to the instrument main body.

2. Description of the Related Art

As an insert type cutting instrument, the insert type cutting instrument including a circular-cylindrical instrument main body and an insert is well known. In the insert type cutting instrument, the instrument main body has a tip pocket formed on an outer side surface of a head portion of the instrument main body, and an insert seat located backward of the tip pocket in a reverse rotation direction of the instrument main body. The insert having a cutting edge is attached to the insert seat.

The insert as mentioned above is formed like a polygonal flat plate. A through-hole going through the insert in a thickness direction of the insert is formed in the insert. A clamping screw is inserted into the through-hole, the clamping screw is tightly screwed into a screw hole formed in the insert seat, and thereby the insert is tightly attached to the insert seat.

Recently, in order to improve the efficiency of cutting, there is a tendency to speed up the rotation speed of the instrument main body. In particular, in cutting of an aluminum or aluminum base alloy, the instrument main body is rotated at a speed over 20,000 rpm. When the instrument main body is high-speed rotated as mentioned above, a centrifugal force acts on the insert with increasing rotation speed of the instrument main body, and thereby the insert may be displaced with respect to the instrument main body. If the insert is displaced, it is impossible to perform cutting with high accuracy, and the insert may become damaged due to cutting resistance.

In Published Japanese Translation No. 2000-504280 of the PCT International Application, a cutting instrument having an instrument main body and inserts is proposed. Each of the inserts is tightly attached to the instrument main body by two clamping screws. In the insert type cutting instrument, the insert is formed like a rectangular flat plate. The insert is located so that long side edges of the insert are substantially parallel to an axis of the instrument main body, and then the insert is tightly attached to the instrument main body using the clamping screw and another clamping screw located closer to a base end of the instrument main body than the clamping screw.

In the insert type cutting instrument in Published Japanese Translation No. 2000-504280 of the PCT International Application, the clamping screw located close to a tip of the instrument main body descends toward the axis of the instrument main body. In addition, another clamping screw located close to the base end of the instrument main body descends toward the axis of the instrument main body and descends toward the base end of the instrument main body. That is, a part of the insert located so as to be close to the tip of the instrument main body is pushed toward the axis of the instrument main body (in a direction orthogonal to the axis of the instrument main body), and a part of the insert located so as to be close to the base end of the instrument main body is pushed toward the axis of the instrument main body, and is pushed toward the base end of the instrument main body (in a direction obliquely intersecting with the axis of the instrument main body).

When the centrifugal force acts on the insert by rotating the instrument main body, the insert tends to separate from the axis of the instrument main body along a wall surface of an insert seat facing to the tip of the instrument main body. Further, a moment acts on the insert centering around a corner of the insert located near the wall surface of the insert seat close to an outer circumferential side end portion of the instrument main body by the centrifugal force acting on a center of gravity of the insert. If the part of the insert close to the tip of the instrument main body is heavy, the moment increases extremely.

In the insert type cutting instrument in Published Japanese Translation No. 2000-504280 of the PCT International Application, the insert is pushed in a direction obliquely intersecting with the centrifugal force, and is pushed in a direction obliquely intersecting with the moment, by the clamping screw located close to the tip of the instrument main body. Therefore, the insert may be not tightly attached to the instrument main body.

Further, a positional relationship between the two through-holes may get out of imperceptibly order due to a dispersion of the accuracy with cutting the two through-holes in the insert. If the distance between the two through-holes is shorter than its order, the insert is pushed to the tip of the instrument main body by the clamping screw located close to the tip of the instrument main body. Accordingly, the two clamping screws push the insert in conflicting directions to each other, and thereby the insert can not be not tightly attached to the instrument main body. As a result, a cutting accuracy by the insert type cutting instrument may deteriorate by a displacement of the insert caused by the centrifugal force, and the insert may become damaged.

The present invention is conceived in view of the above-described circumstances, and it is an object thereof to provide an insert type cutting instrument which enables tight attachment of an insert so as not to move by the centrifugal force while the instrument main body is high-speed rotated, the insert included in this insert type cutting instrument, and a method for attaching this insert to an instrument main body.

SUMMARY OF THE INVENTION

An insert type cutting instrument of the present invention includes: an insert formed as a flat polygonal plate, and which has an upper surface formed as a rake surface and a lower surface facing opposite the upper surface; an instrument main body allowed to rotate centering around an axis, and which has a recessed portion formed on an outer side surface of a head portion of the instrument main body; and an insert seat formed on a wall surface of the recessed portion facing in a normal rotation direction of the instrument main body, and to which the insert is attached so that the lower surface of the insert contacts the insert seat and the upper surface of the insert faces in the normal rotation direction of the instrument main body.

A first through-hole which goes through the upper surface of the insert and the lower surface, and a second through-hole which goes through the upper surface and the lower surface and which is located closer to a tip of the instrument main body than the first through-hole when the insert is mounted on the insert seat are formed in the insert.

A first screw hole and a second screw hole located closer to the tip of the instrument main body than the first screw hole are formed in the insert seat of the instrument main body so that the first screw hole separates from the second screw hole in the axial direction.

The insert is mounted on the insert seat so that the center of the first screw hole is located closer to the axis of the instrument main body than the center of the first through-hole and is located closer to a base end of the instrument main body than the center of the first through-hole, and the center of the second screw hole is located closer to the axis of the instrument main body than a center of the second through-hole and is located closer to the base end of the instrument main body than the center of the second through-hole.

A degree $\theta1$ of a first inclination angle formed by the intersection of a straight line passing through the center of the first screw hole and the center of the first through-hole with the axis is equal to or less than a degree $\theta2$ of a second inclination angle formed by the intersection of a straight line passing through the center of the second screw hole and the center of the second through-hole with the axis.

An insert of the present invention is attached to an insert seat of an instrument main body, wherein the insert is formed as a flat polygonal plate, and which has an upper surface formed as a rake surface and a lower surface facing opposite the upper surface, and two through-holes which go through from the upper surface to the lower surface are formed in the insert.

A method for attaching an insert to an instrument main body of the present invention with the above-mentioned insert type cutting instrument, includes: pushing the insert toward the base end of the instrument main body and toward the axis of the instrument main body by screwing a first clamping screw member through the first through-hole of the insert into the first screw hole of the instrument main body; and pushing the insert toward the base end of the instrument main body and toward the axis of the instrument main body by screwing a second clamping screw member through the second through-hole of the insert into the second screw hole of the instrument main body.

According to the insert type cutting instrument and the insert, the first through-hole and the second through-hole are formed in the insert, and the first screw hole and the second screw hole are formed in the insert seat. Also, a first clamping screw and a second clamping screw are respectively inserted into the first through-hole and the second through-hole, and then the first clamping screw and the second clamping screw are respectively tightly screwed into the first screw hole and the second screw hole as the attaching method as mentioned above, and thereby the insert is attached to the instrument main body. In a condition that the insert is mounted on the insert seat, the first screw hole of the insert seat is located closer to the base end of the instrument main body than the second screw hole, and the first through-hole of the insert is located closer to the base end of the instrument main body than the second through-hole. Also, the center of the first screw hole of the insert seat is located closer to an axis of the instrument main body, and is located closer to the base end of the instrument main body than the center of the first through-hole of the insert. Then, the first clamping screw is tightly screwed into the first screw hole, and thereby the insert is pushed toward the axis of the instrument main body, and is pushed toward the base end of the instrument main body. Therefore, the insert is tightly attached to the instrument main body.

Further, in the condition that the insert is mounted on the insert seat, the second screw hole of the insert seat is located closer to the tip of the instrument main body than the first screw hole, and the second through-hole of the insert is located closer to the tip of the instrument main body than the first through-hole. Also, the center of the second screw hole of the insert seat is located closer to the axis of the instrument main body than the center of the second through-hole of the insert, and is located closer to the base end of the instrument main body than the center of the second through-hole. Then, the second clamping screw is tightly screwed into the second screw hole, and thereby the insert is pushed toward the base end of the instrument main body, and is pushed toward the base end of the instrument main body. Therefore, the insert is attached to the instrument main body. As a result, if the distance between the two through-holes is shorter than its order, it is possible to prevent the insert from pushing toward the tip of the instrument main body by the second clamping screw located close to the tip of the instrument main body. Therefore, the insert can be reliably attached to the instrument main body.

In addition, the first inclination angle is formed by the intersection of a straight line passing through the center of the first screw hole and the center of the first through-hole with the axis, and the second inclination angle is formed by the intersection of a straight line passing through the center of the second screw hole and the center of the second through-hole with the axis. The degree $\theta1$ of the first inclination angle is equal to or less than the degree $\theta2$ of the second inclination angle. Accordingly, the insert is pushed toward an intersectional portion of a wall surface of the insert seat facing to the tip of the instrument main body and a wall surface of the insert seat facing opposite to the axis of the instrument main body, and thereby the insert is attached to the insert seat. Therefore, it is possible to improve the positional accuracy of the insert while the insert is attached to the insert seat. Further, the insert is pushed in an opposite direction of the centrifugal force and the moment acting on the insert, and thereby the insert is attached to the insert seat. Therefore, while the instrument main body is high-speed rotated, the displacement of the insert caused by the centrifugal force does not occur. As a result, it is possible to accurately perform the cutting using the insert type cutting instrument, and it is possible to prevent the insert from being damaged.

The present invention may be arranged such that the degree $\theta1$ of the first inclination angle is greater than or equal to 15° and less than or equal to 45°. Therefore, the insert is reliably pushed toward the intersectional portion of a wall surface of the insert seat facing to the tip of the instrument main body and the wall surface of the insert seat facing opposite to the axis of the instrument main body. As a result, it is possible to additionally improve the positional accuracy of the insert while the insert is attached to the insert seat.

In addition, the present invention may be arranged such that the degree $\theta2$ of the second inclination angle is greater than or equal to 45° and is less than or equal to 85°. Therefore, the insert is reliably pushed in the opposite direction of the centrifugal force and the moment acting on the insert. As a result, while the instrument main body is high-speed rotated, it is possible to reliably prevent the displacement of the insert caused by the centrifugal force.

The present invention may be arranged such that an engagement protruded portion protruding from the lower surface of the insert is formed on the lower surface, and an engagement recessed portion which is able to engage with the engagement protruded portion of the insert is formed on an attachment surface of the insert seat. Alternatively, it may be arranged such that an engagement protruded portion protruding from the attachment surface of the insert seat is formed on the attachment surface, and an engagement recessed portion which is able to engage with the engagement protruded portion is formed on the lower surface of the insert. The engagement protruding portion is engaged with the engagement recessed portion, and thereby the insert can be tightly attached to the insert seat. Further, the engagement protruding portions may be respectively formed around the first screw hole and the second screw hole along with the engagement recessed portions being respectively formed around the first through-hole and the second through-hole. Alternatively, the engagement protruding portions may be respectively formed around the first through-hole and the second through-hole along with the engagement recessed portions being respectively formed around the first screw hole and the second screw hole. Therefore, the insert can be further tightly attached to the insert seat.

Further, in the insert attached to the insert seat, a draft surface is formed at a side surface between an upper surface of the insert as a rake surface and a lower surface of the insert, a nose portion of which a cutting edge is like an arc is formed on a corner portion of the rake surface, and a main cutting edge is formed along a ridge line between the rake surface and the draft surface so as to communicate with one end of the cutting edge of the nose portion. The main cutting edge curves so as to rise toward the rake surface, and is formed so that the distance between the main cutting edge and the lower surface gradually decreases as the main cutting edge separates from the nose portion. Therefore, an axial rake angle is a conformal angle which is larger than the inclination angle of the lower surface with respect to the axis of the instrument main body. As a result, it is possible to reduce the cutting resistance of the insert type cutting device.

In addition, the main cutting edge rises in the normal rotation direction of the instrument main body, and the rake surface communicating with the main cutting edge also rises in the normal rotation direction of the instrument main body. Accordingly, chips tend to separate from the insert of the present invention in comparison with an insert in which a linearly-inclined cutting edge and a flat rake surface are formed. Therefore, while a metal having a highly-ductility such as aluminum or aluminum base alloy is cut, it is possible to improve the chips separating from the insert. As a result, it is possible to perform the high-speed cutting.

The insert of which a part located close to the tip of the instrument main body is thick is attached to the insert seat using the clamping screw located close to the tip of the instrument main body, and thereby the part of the insert located close to the tip of the instrument main body is attached so as to push in the opposite direction of the centrifugal force and the moment acting on the insert. Therefore, while the instrument main body is high-speed rotated, it is possible to reliably prevent the displacement of the insert caused by the centrifugal force and the moment.

As mentioned above, according to the present invention, it is possible to provide an insert type cutting instrument which enables tight attachment of an insert so as not to move by the centrifugal force while the instrument main body is high-speed rotated, and it is possible to provide the insert included in this insert type cutting instrument.

DESCRIPTION OF THE PREFERRED EMBODIMENTS

Figure 10:
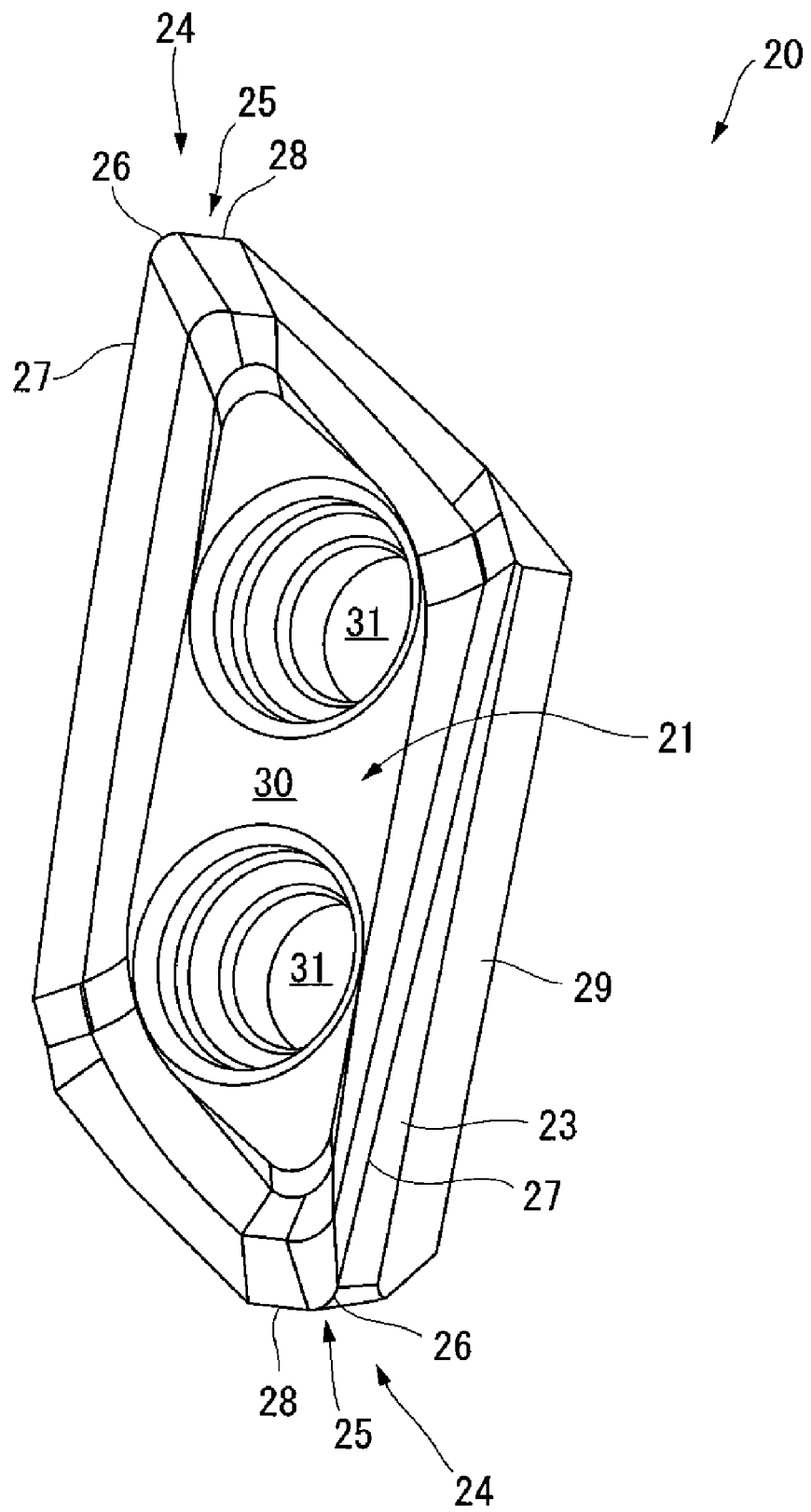
FIG. 10 is a view showing the embodiment of the insert type cutting instrument of the present invention, and shows a perspective view of the insert attached to the instrument main body shown in FIG. 9 and which forms the insert type cutting instrument.
Figure 11:
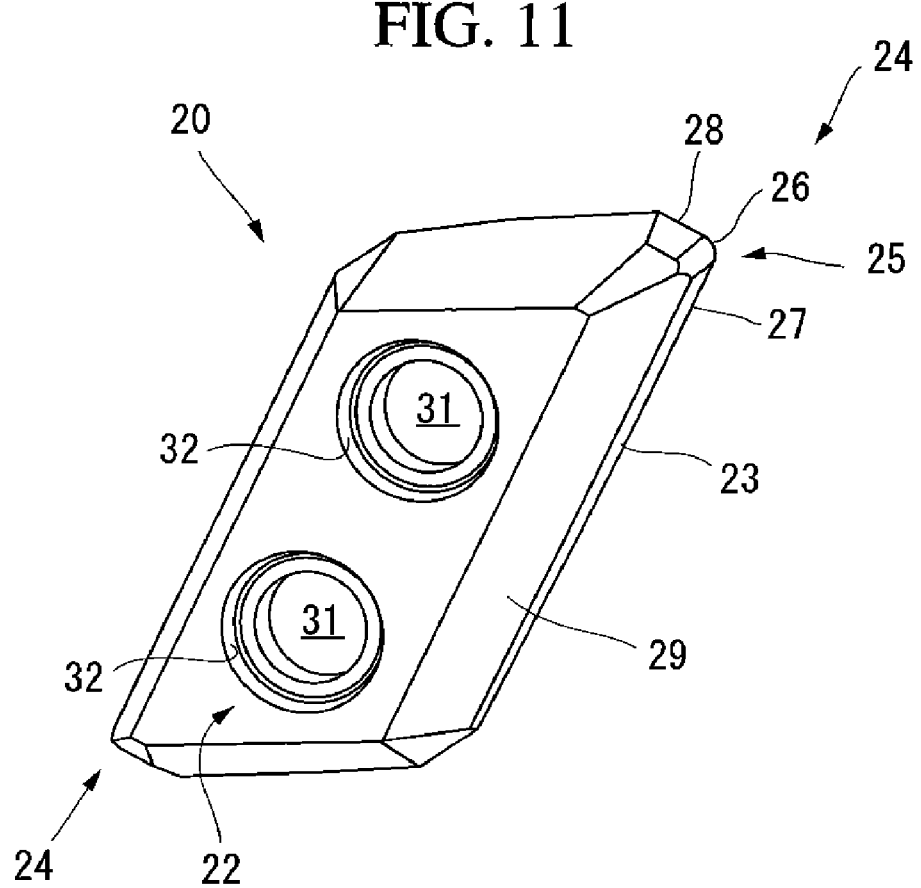
FIG. 11 is a view showing the embodiment of the insert type cutting instrument of the present invention, and shows a perspective view of the insert in FIG. 10 viewed from the lower side of the insert.
Figure 12:
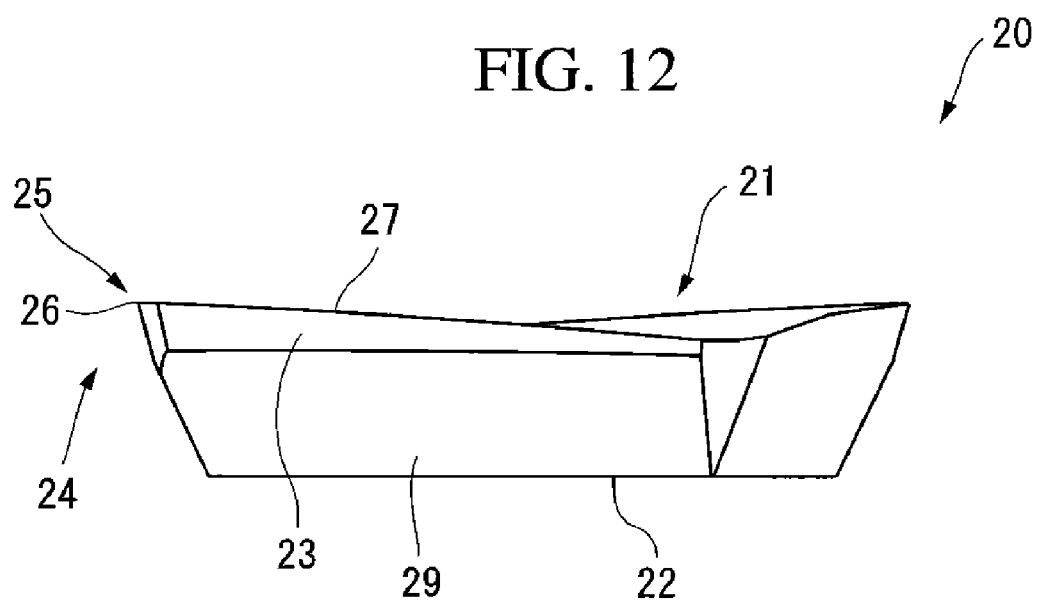
FIG. 12 is a view showing the embodiment of the insert type cutting instrument of the present invention, and shows a side plan view of the insert in FIG. 10 viewed from the lower side of the insert.

An embodiment of the present invention is explained with reference to FIG. 1 through FIG. 12. An insert type cutting instrument of the embodiment of the present invention is shown in FIG. 1 through FIG. 8. An instrument main body is shown in FIG. 9, and an insert is shown in FIG. 10 through FIG. 12.

As shown in FIG. 1 through FIG. 8, an insert type cutting instrument 1 includes an instrument main body 10 formed from steel material and the like, and inserts 20 formed from rigid material such as sintered hard alloy.

Figure 9:
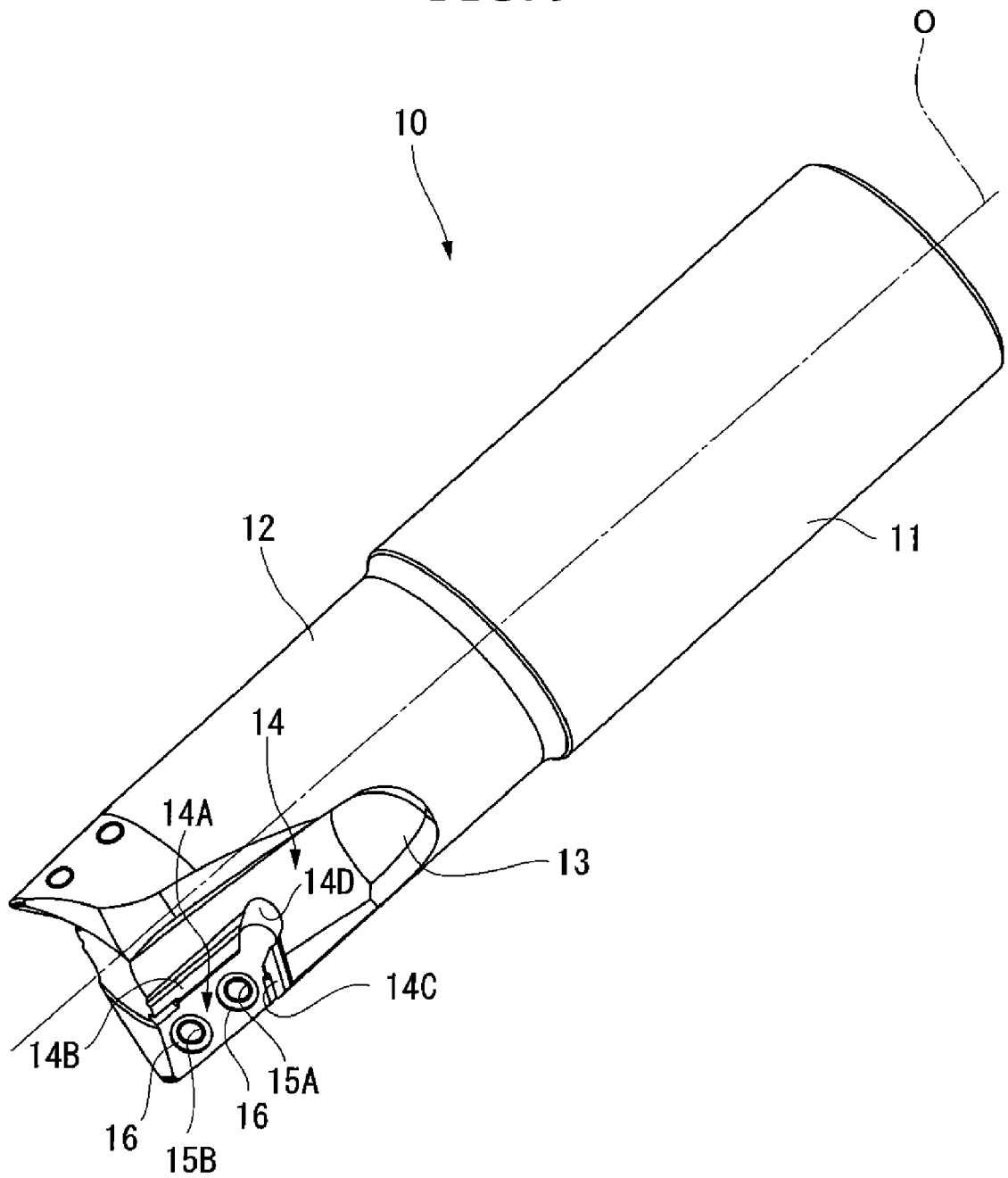
FIG. 9 is a view showing the embodiment of the insert type cutting instrument of the present invention, and shows the instrument main body which forms the insert type cutting instrument.

As shown in FIG. 9, the instrument main body 10 is formed like a solid circular cylinder, and a cutting edge portion 12 is provided at a substantially half part of the instrument main body 10 which is close to a base end of the instrument main body 10. A large-diameter portion 11 of which the diameter is larger than that of the cutting edge portion 12 is provided at a substantially half part of the instrument main body which is close to a tip of the instrument main body 10. Tip pockets (recessed portion) 13 which open so as to face to the opposite side of an axis O of the instrument main body 10 along with to face to the tip of the instrument main body 10 are formed in an outer side surface of a head portion of the cutting edge portion 12. In the present invention, two tip pockets 13 are located so that one of the tip pockets 13 is separated from the other of the tip pockets 13 across the axis O, and one of the tip pockets 13 is out of phase with the other of the tip pockets 13 by 180°.

Figure 2:
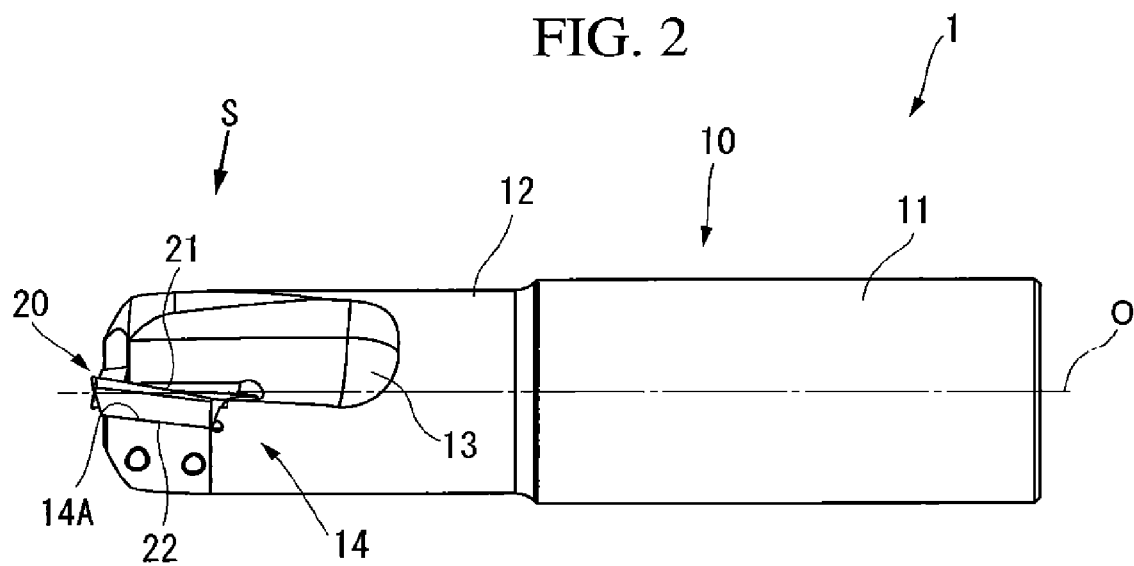
FIG. 2 is a side plan view showing the embodiment of the insert type cutting instrument of the present invention.

Insert seats 14 are formed in the cutting edge portion 12 so that each of the insert seats 14 dents in a reverse rotation direction of the instrument main body 10 with respect to the tip pocket 13. A wall surface of each of the insert seats 14 facing in a normal rotation direction of the instrument main body 10 forms an attachment surface 14A. As shown in FIG. 2, an attachment surface 14A is inclined with respect to the axis O so as to gradually retract in the reverse rotation direction of the instrument main body 10 as the attachment surface 14A is close to the base end of the instrument main body 10.

As shown in FIG. 9, in each of the attachment surfaces 14A, a first screw hole 15A and a second screw hole 15B located closer to the tip of the instrument main body 10 than the first screw hole 15A are formed so as to drill the instrument main body 10. The first screw hole 15A is formed to be orthogonal to the attachment surface 14A. A circular engagement protrusion 16 protruding from the attachment surface 14A is formed around an opening of the first screw hole 15A. The second screw hole 15B is also formed to be orthogonal to the attachment surface 14A. Another circular engagement protrusion 16 protruding from the attachment surface 14A is also formed around an opening of the second screw hole 15B.

As shown in FIG. 9, a wall surface 14B of the insert seat 14 which faces to the opposite side of an axis O of the instrument main body 10 is formed so as to be substantially parallel to the axis O. A wall surface 14C of the insert seat 14 which faces to the tip of the instrument main body 10 is inclined so as to gradually retract toward the base end of the instrument main body 10 as the wall surface 14C is close to the axis O of the instrument main body 10. A notch portion 14D is formed at an intersection portion of the wall surface 14 and the wall surface 14C.

As shown in FIG. 10, the insert 20 is like a flat plate. When the insert 20 is seen in a plan view, the insert 20 is formed like a parallelogram having the rotational symmetry by 180°. The insert 20 has an upper surface formed as a rake surface 21 and a lower surface formed as a seating surface 22. Nose portions 25 and 25 are respectively formed at acute angle corners 24 and 24 located at opposite corners of the rake surface 21 formed like the parallelogram. A circular arc cutting edge 26 is formed along a ridge line between one of the nose portions 25 and the rake surface 21. Another circular arc cutting edge 26 is formed along a ridge line between the other of the nose portions 25 and the rake surface 21. In addition, the insert 20 is formed so that an apex angle of each of the acute angle corners 24 and 24 is such as 60°. Therefore, a ramping angle of the insert 20 is maintained while cross-feeding and also diagonal-feeding of the cutting instrument.

Further, a first draft surface 23 is formed at a part of the insert 20 located between the rake surface 21 and the seating surface 22 and which is in the vicinity of one of the nose portions 25. Another first draft surface 23 is formed at a part of the insert 20 located between the rake surface 21 and the seating surface 22 and which is in the vicinity of the other of the nose portions 25. One of the first draft surfaces 23 faces opposite to the other of the first draft surfaces 23. A main cutting edge 27 is formed along a ridge line between one of the first draft surfaces 23 and the rake surface 21, and the main cutting edge 27 communicates with one end of the cutting edge 26 of one of the nose portions 25. Another edge 27 is formed along a ridge line between the other of the first draft surfaces 23 and the rake surface 21, and the main cutting edge 27 communicates with one end of the cutting edge 26 of the other of the nose portions 25. One of the main cutting edges 27 faces opposite to the other of the main cutting edges 27. A sub-cutting edge 28 for finishing the surface of the cut material is formed at a part of the cutting edge 26 of one of the nose portions 25 located at the opposite side of the main cutting edge 27 so as to communicate with the other end of the cutting edge 26. Another sub-cutting edge 28 for finishing of the surface of the cut material is formed at a part of the cutting edge 26 of the other of the nose portions 25 located at the opposite side of the main cutting edge 27 so as to communicate with the other end of the cutting edge 26. When the insert 20 is seen in a plan view from the rake surface 21, one of the sub-cutting edges 28 is provided so as to be orthogonal to one of the main cutting edges 27, and the other of the sub-cutting edges 28 is provided so as to be orthogonal to the other of the main cutting edges 27.

When the insert 20 is seen in a plan view from the rake surface 21, one of the main cutting edges 27 curves like a part of an outline of an ellipse so as to rise outward. Further, when the insert 20 is seen in a plan view from the first draft surface 23, one of the main cutting edges 27 curves so as to rise toward the rake surface 21. Furthermore, one of the main cutting edges 27 is formed so that the distance between one of the main cutting edges 27 and the seating surface 22 becomes shorter as one of the main cutting edges 27 separates from one of the nose portions 25. A part of the insert 20 which extends toward the center of the rake surface 21 from one of the main cutting edges 27 is formed so as to rise like the main cutting edges 27.

When the insert 20 is seen in a plan view from the rake surface 21, the other of the main cutting edges 27 also curves like a part of an outline of an ellipse so as to rise outward. Further, when the insert 20 is seen in a plan view from the first draft surface 23, the other of the main cutting edges 27 curves so as to rise toward the rake surface 21. Furthermore, the other of the main cutting edges 27 is formed so that the distance between the other of the main cutting edges 27 and the seating surface 22 becomes shorter as the other of the main cutting edges 27 separates from the other of the nose portions 25. A part of the insert 20 which extends toward the center of the rake surface 21 from the other of the main cutting edges 27 is also formed so as to rise like the main cutting edges 27.

The main cutting edges 27 and the rake surface 21 are formed as mentioned above. Accordingly, the thickness of each of parts of the insert 20 which is close to the nose portions 25 is larger than the other part of the insert 20, and each of the parts of the insert 20 is heavier than the other part of the insert 20.

Further, a flat second draft surface 29 is formed at a part of the insert 20 which is closer to the seating surface 22 than one of the first draft surfaces 23 communicating with one of the main cutting edges 27 so that a draft angle of the second draft surface 29 is larger than that of the first draft surface 23. Another flat second draft surface 29 is formed at a part of the insert 20 which is closer to the seating surface 22 than the other of the first draft surfaces 23 communicating with the other of the main cutting edges 27 so that the draft angle of the second draft surface 29 is larger than that of the first draft surface 23.

A flat surface portion 30 which is parallel to the seating surface 22 is formed at the center of the rake surface 21 so as to be formed like a parallelogram as the insert 20.

As shown in FIG. 10 and FIG. 12, two through-holes 31 and 31 are formed in the insert 20. The through-holes 31 and 31 go through from the seating surface 22 to the flat surface portion 30 being parallel to the seating surface 22, and line along a direction of the long side of the insert 20 formed like a parallelogram. Further, each of the through-holes 31 and 31 extends in a direction orthogonal to the seating surface 22 and the flat surface portion 30. Substantially circular-conical surfaces are respectively formed at openings of the through-holes 31 and 31 which are close to the rake surface 21 so as to be recessed toward the seating surface 22. Engagement recessed portions 32 and 32 are respectively formed at openings of the through-holes 31 and 31 which are close to the seating surface 22 so as to be recessed toward the rake surface 21.

Figure 1:
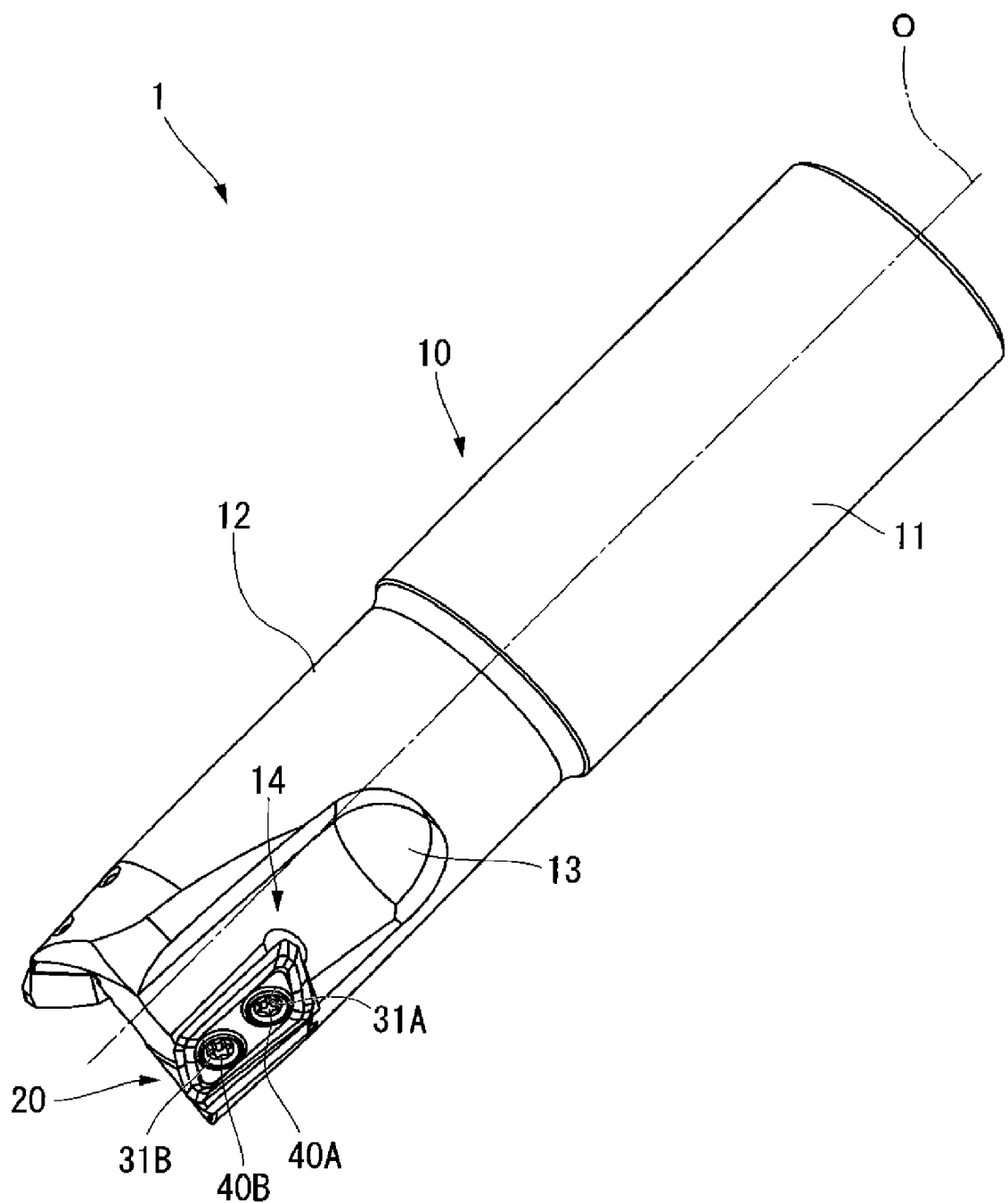
FIG. 1 is a perspective view showing an embodiment of an insert type cutting instrument of the present invention.
Figure 3:
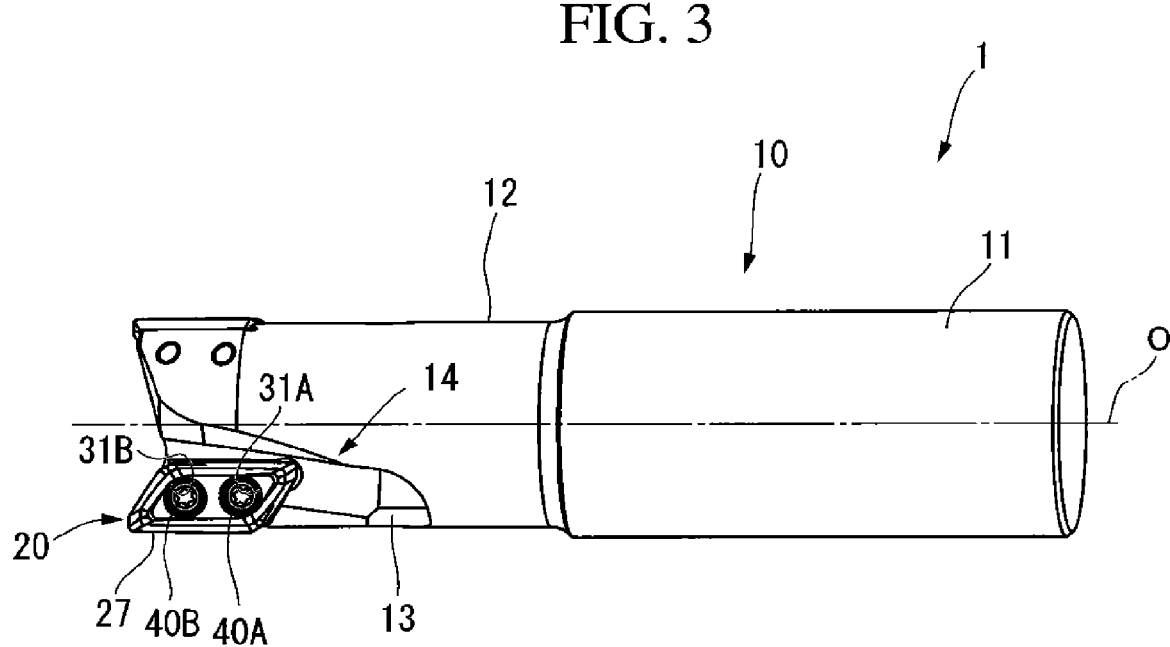
FIG. 3 is a view showing the embodiment of the insert type cutting instrument of the present invention, and shows a side plan view of the insert type cutting instrument viewed from a direction of an arrow in FIG. 2.

As shown in FIG. 1 and FIG. 3, each of the insert 20 is located so that either one of the nose portions 25 faces to the tip of the instrument main body 10, and is mounted on the insert seat 14 so that the engagement protrusions 16 and 16 are respectively engaged with the engagement recessed portions 32 and 32. Note that, the attachment surface 14A of the insert seat 14 is inclined with respect to the axis O so as to retract in the reverse rotation direction of the instrument main body 10 as the attachment surface 14A is close to the base end of the instrument main body 10. Accordingly, the seating surface 22 of the insert 20 is inclined with respect to the axis O so as to retract in the reverse rotation direction of the instrument main body 10 as the seating surface 22 is close to the base end of the instrument main body 10.

Figure 4:
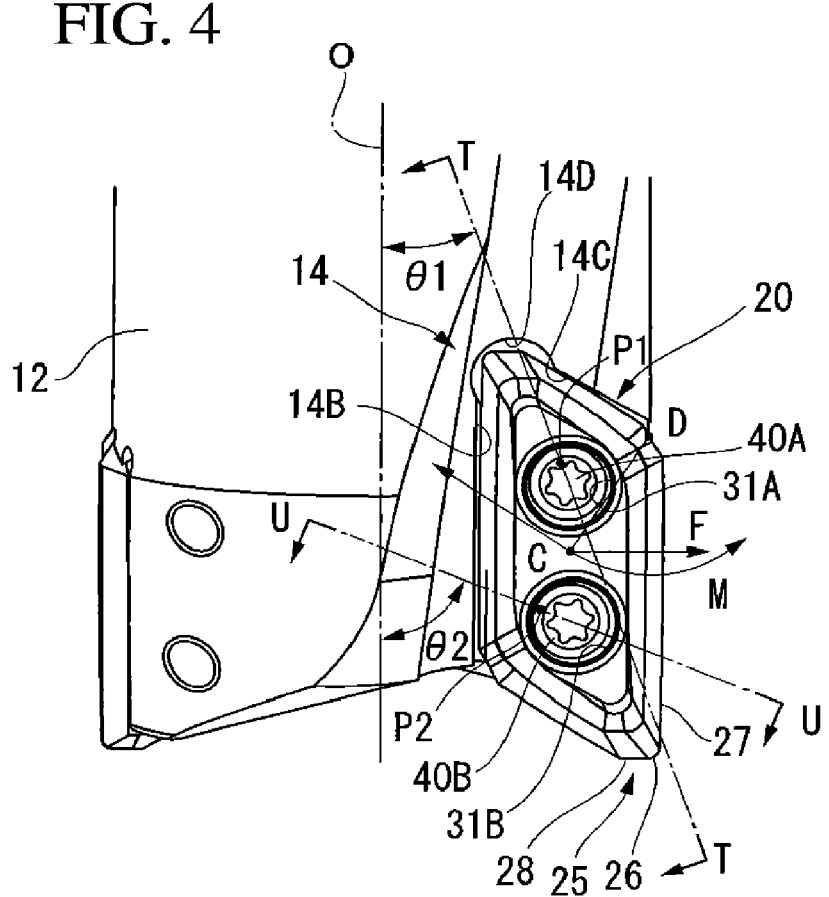
FIG. 4 is a view showing the embodiment of the insert type cutting instrument of the present invention, and shows an enlarged view of an insert seat and around thereof.
Figure 5:
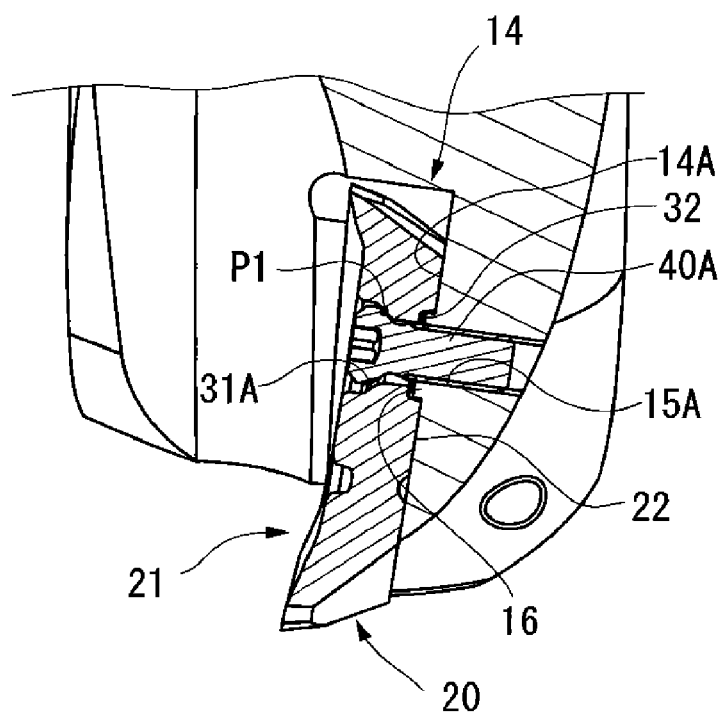
FIG. 5 is a view showing the embodiment of the insert type cutting instrument of the present invention, and shows a sectional view taken along a T-T line in FIG. 4.
Figure 6:
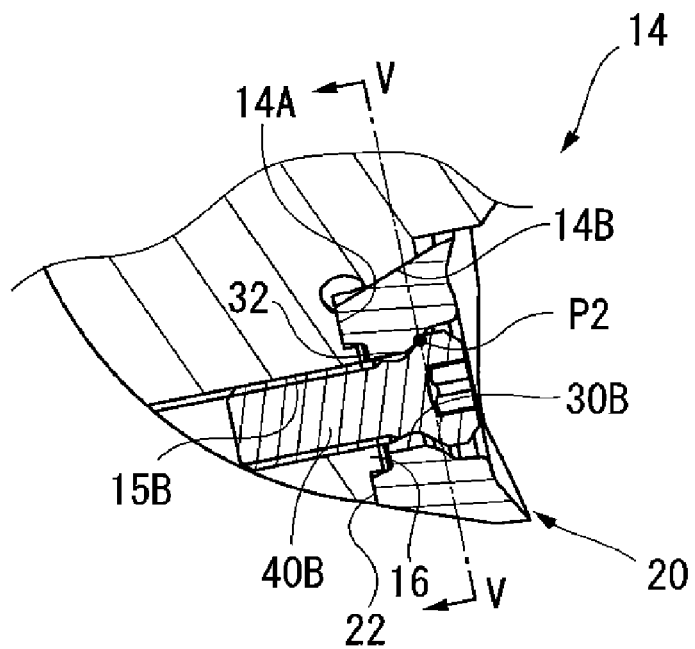
FIG. 6 is a view showing the embodiment of the insert type cutting instrument of the present invention, and shows a sectional view taken along a U-U line in FIG. 4.
Figure 7:
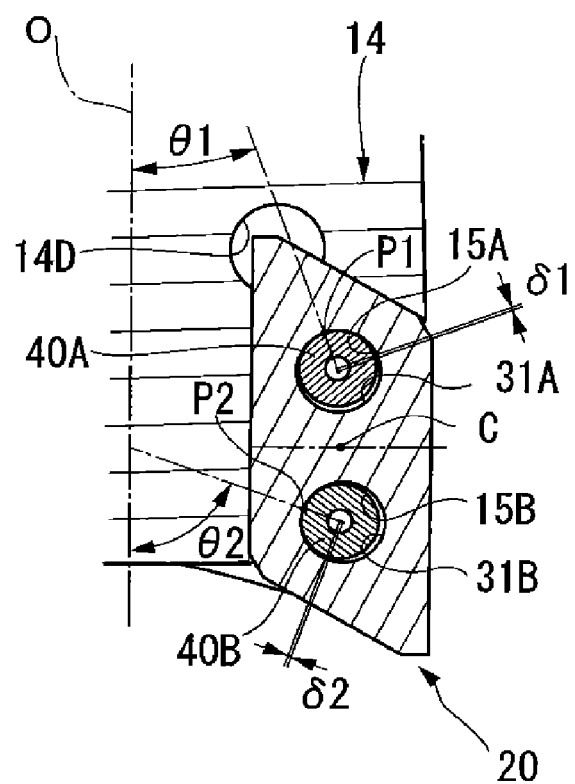
FIG. 7 is a view showing the embodiment of the insert type cutting instrument of the present invention, and shows a sectional view of the insert type cutting instrument taken along a V-V line in FIG. 6.

In a condition that the insert 20 is mounted on the insert seat 14, one of the through-holes 31 located closer to the base end of the instrument main body 10 than the other of the through-holes 31 acts as a first through-hole 31A, and the other of the through-holes 31 located closer to the tip of the instrument main body 10 than the first through-holes 31A acts as a second through-hole 31B. As shown in FIG. 4 and FIG. 7, the center of the first screw hole 15A of the insert seat 14 is located closer to the base end of the instrument main body 10 than the center of the first through-hole 31A of the insert 20, and is located closer to the axis O of the instrument main body 10 than the center of the first through-hole 31A. The first screw hole 15A is decentered from the first through-hole 31A by only a small distance of $\delta 1$. The center of the second screw hole 15B of the insert seat 14 is also located closer to the base end of the instrument main body 10 than the center of the second through-hole 31B of the insert 20, and is located closer to the axis O of the instrument main body 10 than the center of the second through-hole 31B. The second screw hole 15B is decentered from the second through-hole 31B by only a small distance of $\delta 2$. An angle formed by the intersection of a straight line passing through the center of the first screw hole 15A and the center of the first through-hole 31A with the axis O acts as a first inclination angle, and the degree of the first inclination angle is $\theta 1$. Further, an angle formed by the intersection of a straight line passing through the center of the second screw hole 15B and the center of the second through-hole 31B with the axis O acts as a second inclination angle, and the degree of the second inclination angle is $\theta 2$. The degree $\theta 1$ of the first inclination angle is equal to or less than the degree $\theta 2$ of the second inclination angle. Specifically, the degree $\theta 1$ of the first inclination angle is greater than or equal to 15° and is less than or equal to 45°, and the degree $\theta 2$ of the first inclination angle is greater than or equal to 45° and is less than or equal to 85°.

In this embodiment, as shown in FIG. 4, an angle of each of the nose portions 25 and 25 of the insert 20 is substantially equal to 60°, and each of the main cutting edges 27 and 27 which respectively communicate with the nose portions 25 and 25 is located so as to be substantially parallel to the axis O. The degree $\theta 1$ of the first inclination angle is set to about 20° so that the straight line passing through the center of the first screw hole 15A and the center of the first through-hole 31A extends to the notch portion 14D of the insert seat 14. The degree $\theta 2$ of the second inclination angle is set to about 70° so as to be slightly larger than an angle formed by the intersection of a straight line passing through the gravity center of the insert 20 and a blunt angle portion D of the nose portion 25 located close to the base end of the instrument main body 10 with the axis O. That is, in this embodiment, the degree $\theta 1$ is smaller than the degree $\theta 2$.

The insert 20 mounted on the attachment surface 14A of the insert seat 14 is attached to the instrument main body 10 using a first clamping screw 40A and a second clamping screw 40B. A protruding circular-conical surface of which the diameter is smaller than that of the substantially circular-conical surface of the through-hole 31 is formed at a back side of a head of each of the first clamping screw 40A and the second clamping screw 40B. The first clamping screw 40A goes through the first through-hole 31A, and then is tightly screwed into the first screw hole 15A. In addition, the second clamping screw 40B goes through the second through-hole 31B and then is tightly screwed into the second screw hole 15B. Therefore, the insert 20 is attached to the insert seat 14 of the instrument main body 10.

In a condition that the insert 20 is attached to the insert seat 14 of the instrument main body 10, the center of the first screw hole 15A is located closer to the base end of the instrument main body 10 than the center of the first through-hole 31A, and is located closer to the axis O of the instrument main body 10 than the center of the first through-hole 31A. Accordingly, the first clamping screw 40A contacts the first through-hole 31A at a contact point P1, and pushes the insert 20 toward the base end of the instrument main body 10, and pushes the insert 20 toward the axis O of the instrument main body 10. In addition, the center of the second screw hole 15B is located closer to the base end of the instrument main body 10 than the center of the second through-hole 31B, and is located closer to the axis O of the instrument main body 10 than the center of the second through-hole 31B. Accordingly, the second clamping screw 40B contacts the second through-hole 31B at a contact point P2, and pushes the insert 20 toward the base end of the instrument main body 10, and further pushes the insert 20 toward the axis O of the instrument main body 10.

In a condition that the insert 20 is attached to the insert seat 14, when a centrifugal force acts on the insert 20 by rotating the instrument main body 10, as shown in FIG. 4, the insert 20 tends to move along the wall surface 14C of the insert seat 14 which faces to the tip of the instrument main body 10 so as to separate from the axis O. Further, the centrifugal force acting on the gravity center C of the insert 20 causes a moment M centering around the blunt angle portion D of the nose portion 25 located close to the base end of the instrument main body 10. In a case where the nose portion 25 is thick, and a part of the insert 20 which is close to the tip of the instrument main body 10 is heavy, the moment M becomes extremely large.

However, according to the insert type cutting instrument 1 of this embodiment, the part of the insert 20 located close to the base end of the instrument main body 10 is pushed toward the base end of the instrument main body 10, and is pushed toward the axis O of the instrument main body 10 by the first clamping screw 40A. Further, the part of the insert 20 located close to the tip of the instrument main body 10 is pushed toward the base end of the instrument main body 10, and is pushed toward the axis O of the instrument main body 10 by the second clamping screw 40B. Accordingly, the insert 20 is tightly attached to the insert seat 14 of the instrument main body 10. Therefore, while the instrument main body 10 is high-speed rotated, it is possible to prevent the displacement of the insert 20.

Further, the degree θ1 of the first inclination angle is equal to or less than the degree θ2 of the second inclination angle. Accordingly, the insert 20 is attached to the insert seat 14 so that the part of the insert 20 located close to the base end of the instrument main body 10 is pushed toward the wall surface 14C of the insert seat 14, and is pushed toward the wall surface 14B of the insert seat 14. Therefore, while the insert 20 is attached to the insert seat 14, it is possible to improve the positional accuracy of the insert 20. Further, the insert 20 is attached to the insert seat 14 so that the part of the insert 20 which is close to the tip of the instrument main body 10 is pushed in an opposite direction of the centrifugal force F and the moment M. Therefore, while the instrument main body 10 is high-speed rotated, the displacement of the insert 20 caused by the centrifugal force does not occur. As a result, it is possible to accurately perform the cutting using the insert type cutting instrument 1, and it is possible to prevent the insert 20 from being damaged.

It may be arranged such that the degree θ1 of the first inclination angle be greater than or equal to 15° and be less than or equal to 45°. In this embodiment, since the degree θ1 is about 20°, the part of the insert 20 located close to the base end of the instrument main body 10 is reliably pushed toward the notch portion 14D formed at the intersectional portion of a wall surface 14C of the insert seat 14 and a wall surface 14B of the insert seat 14. Therefore, while the insert 20 is attached to the insert seat 14, it is possible to further improve the positional accuracy of the insert 20.

Further, it may be arranged such that the degree θ2 of the second inclination angle be greater than or equal to 45° and be less than or equal to 85°. In this embodiment, since the degree θ2 is about 70°, the part of the insert 20 located close to the tip of the instrument main body 10 is pushed in the opposite direction of the centrifugal force F and the moment M acting on the insert 20 (in a direction which is substantially parallel to a direction E in FIG. 4). Therefore, while the instrument main body 10 is high-speed rotated, it is possible to reliably prevent the displacement of the insert 20 caused by the centrifugal force F and the moment M.

Figure 8:
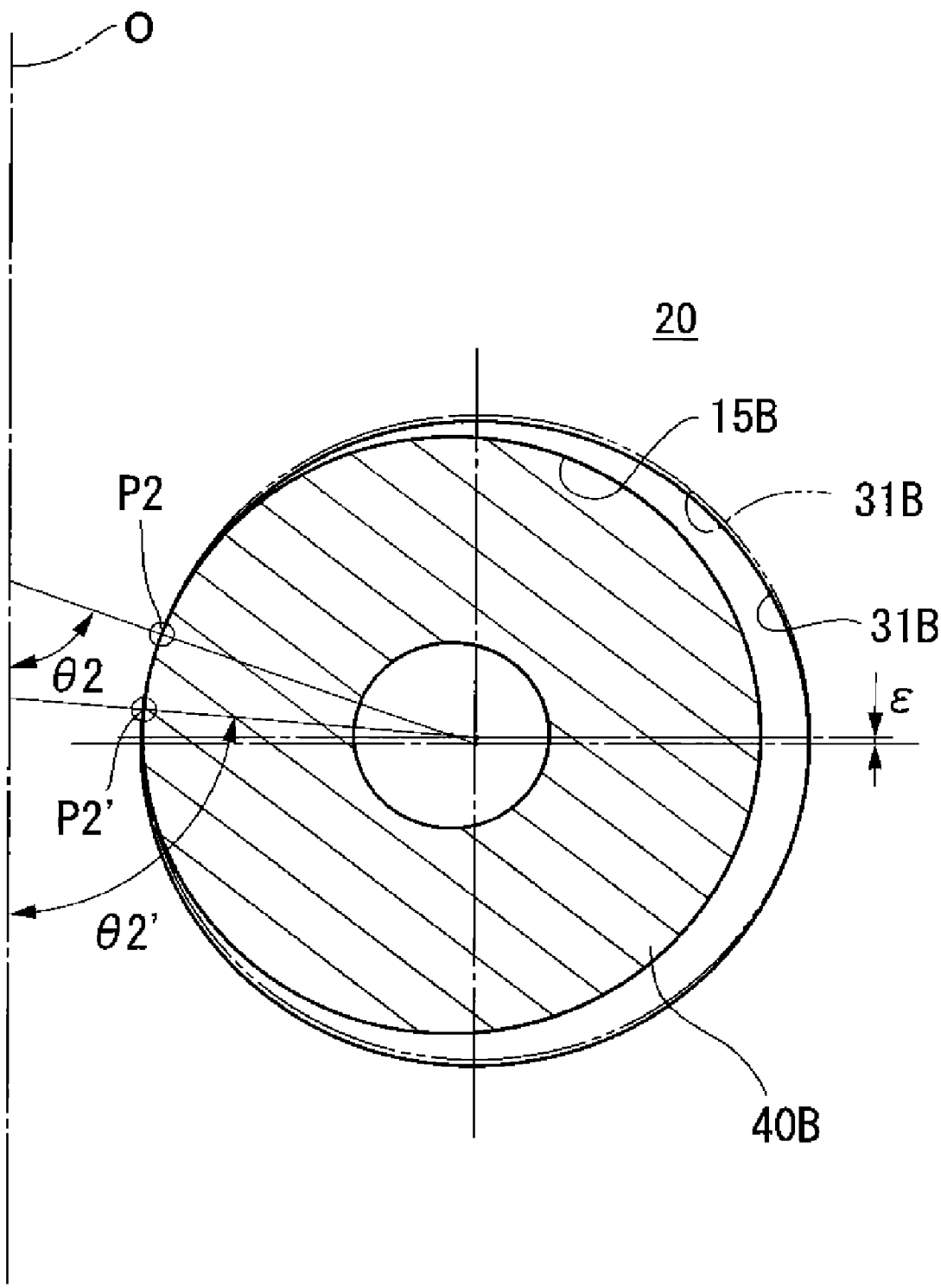
FIG. 8 is a plan view showing a condition in which a second through-hole of the insert contacts a second clamping screw screwed into a second screw hole of the instrument main body.

The insert 20 pushed by the second clamping screw 40B is shown in FIG. 8. If the distance between the first through-hole 31A and the second through-hole 31B is a predetermined length, the second clamping screw 40B contacts the second through-hole 31B at the contact point P2, and the insert 20 is pushed in an inclined direction with respect to the axis O by the angle θ2 (specifically, inclined with respect to the axis O by about 70°). If the distance between the first through-hole 31A and the second through-hole 31B is shorter than the predetermined length by only ε due to a dispersion of machining accuracy with cutting the two through-holes 31 and 31 in the insert 20, the second clamping screw 40B contacts the second through-hole 31B at the contact point P2', and the insert 20 is pushed in an inclined direction with respect to the axis O by the angle θ2'.

However, according to the insert type cutting instrument 1 of this embodiment, the center of the second screw hole 15B of the instrument main body 10 is located closer to the axis O of the instrument main body 10 than the center of the second through-hole 31B of the insert 20, and is located closer to the base end of the instrument main body 10 than the center of the second through-hole 31B. Accordingly, as shown in FIG. 8, in a case where the distance between the first through-hole 31A and the second through-hole 31B is shorter than the predetermined length by only ε, the angle θ2' is not over 90°, and it is possible to prevent the insert 20 from pushing toward the tip of the instrument main body 10 by the second clamping screw 40B. Therefore, the insert 20 is not pushed in opposite directions by the first clamping screw 40A and the second clamping screw 40B. As a result, it is possible to reliably attach the insert 20 to the insert seat 14.

Further, since the engagement recessed portions 32 formed at the seating surface 22 of the insert 20 are respectively engaged with the engagement protrusions 16, it is possible to tightly attach the insert 20 to a predetermined position of the insert seat 14. In this embodiment, the engagement protrusions 16 and 16 are respectively formed in the first screw hole 15A and the second screw hole 15B. Accordingly, the engagement protrusions 16 and 16 are respectively engaged with the engagement recessed portions 32 and 32, and thereby it is possible to further tightly attach the insert 20 to the predetermined position.

In the insert 20 mounted on the insert seat 14, since each of the main cutting edges 27 curves so as to rise toward the rake surface 21 so that the distance between the seating surface 22 and each of the main cutting edges 27 gradually becomes shorter as each of the main cutting edges 27 separates from each of the nose portions 25. Therefore, as shown in FIG. 2, in the condition that the insert 20 is attached to the insert seat 14, since an axial rake angle of each of the main cutting edges 27 is a conformal angle which is larger than an inclination angle of the attachment surface 14A with respect to the axis O, it is possible to reduce the cutting resistance of the insert type cutting instrument 1.

In addition, each of the main cutting edges 27 rises forward in the normal rotation direction of the instrument main body 10, and the rake surface 21 communicating with each of the main cutting edges 27 also rises forward in the normal rotation direction of the instrument main body. Accordingly, chips tend to separate from the insert 20. Therefore, while a metal having a high-ductility such as aluminum or aluminum base alloy is cut, it is possible to improve the chips separating from the insert 20. As a result, it is possible to perform the high-speed cutting.

The insert 20 of which a part located close to the tip of the instrument main body 10 is thick is attached to the insert seat 14 using the clamping screw 40B located close to the tip of the instrument main body 10. Accordingly, the part of the insert 20 located close to the tip of the instrument main body 10 is attached so as to push in the opposite direction of the centrifugal force F and the moment M acting on the insert 20. Therefore, while the instrument main body 10 is high-speed rotated, it is possible to reliably prevent the displacement of the insert 20 caused by the centrifugal force F and the moment M.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

The shape of the instrument main body is not to be considered as limiting. For example, the instrument main body may be provided with a tip pocket, the instrument main body may be provided with three tip pockets.

In this embodiment, the engagement recessed portions 32 and 32 are respectively formed at openings of the through-holes 31 and 31 located at the seating surface 22 of the insert 20, the engagement protrusions 16 and 16 are respectively formed around the first screw hole 15A and the second screw hole 15B. However, the engagement protrusions 16 and 16 may be respectively formed at openings of the through-holes 31 and 31 located at the seating surface 22 of the insert 20, the engagement recessed portions 32 and 32 may be respectively formed around the first screw hole 15A and the second screw hole 15B. When the two engagement recessed portions 32 are provided, the engagement protrusion 16 may be only one. The engagement recessed portions may be formed at the seating surface excluding the openings of the through-holes 31. In response to the engagement recessed portions, the engagement protrusions may be formed at the insert seat 14 excluding the openings of the screw holes. The engagement protrusions may be formed at the seating surface excluding the openings of the through-holes 31. In response to the engagement protrusions, the engagement recessed portions may be formed at the insert seat 14 excluding the openings of the screw holes.

In this embodiment, each of the main cutting edges 27 of the insert 20 curves so as to rise toward the rake surface 21. However, the shape of the insert 20 may be arbitrarily designed in consideration of kinds of the cut material, cutting conditions and the like. The insert as this embodiment may be preferably used because a metal having a high-ductility such as aluminum or aluminum base alloy can be high-speed cut using the insert as this embodiment.

In this embodiment, the degree $\theta 1$ of the first inclination angle is about 20°, and the degree $\theta 2$ of the second inclination angle is about 70°. However, in the present invention, it may be acceptable that the degree $\theta 1$ be less than or equal to the degree $\theta 2$. For example, both of the degree $\theta 1$ and the degree $\theta 2$ may be 45° (the degree $\theta 1$ may be equal to the degree $\theta 2$). It is preferable to set the degree $\theta 1$ of the first inclination angle and the degree $\theta 2$ of the second inclination angle in consideration of the shape of the insert, the shape of the instrument main body and the like.

What is claimed is:

1. An insert type cutting instrument, comprising:
    an insert formed as a flat polygonal plate, and which has an upper surface formed as a rake surface and a lower surface facing opposite the upper surface;
    an instrument main body allowed to rotate centering round an axis, and which has a recessed portion formed on an outer side surface of a head portion of the instrument main body;
    an insert seat formed on a wall surface of the recessed portion facing in a normal rotation direction of the instrument main body, and to which the insert is attached so that the lower surface of the insert contacts the insert seat and the upper surface of the insert faces in the normal rotation direction of the instrument main body; and
    first and second clamping screw members for attaching the insert to the insert seat; wherein
    a first through-hole which goes through the upper surface of the insert and the lower surface, and a second through-hole which goes through the upper surface and the lower surface and which is located closer to a tip of the instrument main body than the first through-hole when the insert is mounted on the insert seat are formed in the insert,
    a first screw hole and a second screw hole located closer to the tip of the instrument main body than the first screw hole are formed in the insert seat of the instrument main body so that the first screw hole separates from the second screw hole in the axial direction and so that each of the first screw hole and the second screw hole is orthogonal to an attachment surface of the insert seat,
    the first clamping screw member is allowed to be screwed into the first screw hole through the first through-hole of the insert, and the second clamping screw member in allowed to be screwed into the second screw hole through the second through-hole of the insert,
    in a condition where the insert is attached to the insert seat by the first and second clamping screw members, the insert is mounted on the insert seat so that the center of the first screw hole is located closer to the axis of the instrument main body than the center of the first through-hole and is located closer to a base end of the instrument main body than the center of the first through-hole, and the center of the second screw hole is located closer to the axis of the instrument main body than the center of the second through-hole and is located closer to the base end of the instrument main body than the center of the second through-hole, and
    a degree $\theta 1$ of a first inclination angle formed by the intersection of a straight line passing through the center of the first screw hole and the center of the first through-hole with the axis is equal to or less than a degree $\theta 2$ of a second inclination angle formed by the intersection of a straight line passing through the center of the second screw hole and the center of the second through-hole with the axis.

2. The insert type cutting instrument according to claim 1, wherein the degree $\theta 1$ of the first inclination angle is greater than or equal to 15 degrees and is less than or equal to 45 degrees and the degree $\theta 2$ of the second inclination angle is greater than or equal to 45 degrees and is less than or equal to 85 degrees.

3. The insert type cutting instrument according to claim 1, wherein
    an engagement protruded portion protruding from the lower surface of the insert is formed on the lower surface, and
    an engagement recessed portion which is able to engage with the engagement protruded portion of the insert is formed on an attachment surface of the insert seat.

4. The insert type cutting instrument according to claim 3, wherein
    the engagement protruded portion is circularly formed around each of openings of the first and second through-holes, and
    the engagement recessed portion is circularly formed around each of openings of the first and second screw holes.

5. The insert type cutting instrument according to claim 3, wherein
    the engagement protruded portion is circularly formed around each of openings of the first and second screw holes, and
    the engagement recessed portion is circularly formed around each of openings of the first and second through-holes.

6. The insert type cutting instrument according to claim 1, wherein
    an engagement protruded portion protruding from an attachment surface of the insert seat is formed on the attachment surface, and
    an engagement recessed portion which is able to engage.

7. A method for attaching an insert to an instrument main body with the insert type cutting instrument according to claim 1, comprising:

pushing the insert toward the base end of the instrument main body and toward the axis of the instrument main body by screwing a first clamping screw member through the first through-hole of the insert into the first screw hole of the instrument main body; and pushing the insert toward the base end of the instrument main body and toward the axis of the instrument main body by screwing a second clamping screw member through the second through-hole of the insert into the second screw hole of the instrument main body.

8. The insert type cutting instrument according to claim 1, wherein engagement protruded portions are respectively formed around openings of the first and second through-holes at the lower surface of the insert in circular shape, engagement recessed portions are formed on an attachment surface of the insert seat, and the engagement protruded portions are allowed to respectively engage with engagement recessed portions.

9. The insert type cuffing instrument according to claim 1, wherein engagement recessed portions are respectively formed around openings of the first and second through-holes at the lower surface of the insert in circular shape, engagement protruded portions are formed on an attachment surface of the insert seat, and the engagement recessed portions are allowed to respectively engage with the engagement protruded portions.

* * * * *